(12) United States Patent
Saito et al.

(10) Patent No.: US 9,206,547 B2
(45) Date of Patent: Dec. 8, 2015

(54) PREPROCESSING LIQUID FOR TEXTILE PRINTING, INK SET FOR INK JET TEXTILE PRINTING, INK JET TEXTILE PRINTING METHOD

(71) Applicant: Seiko Epson Corporation, Tokyo (JP)

(72) Inventors: Toru Saito, Yamagata-mura (JP); Makoto Furue, Saitama (JP); Masakazu Ohashi, Shiojiri (JP); Toshiyuki Miyabayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 322 days.

(21) Appl. No.: 13/853,350

(22) Filed: Mar. 29, 2013

(65) Prior Publication Data

US 2013/0278690 A1 Oct. 24, 2013

(30) Foreign Application Priority Data

Apr. 19, 2012 (JP) ................. 2012-095391

(51) Int. Cl.
| | |
|---|---|
| *B41J 2/01* | (2006.01) |
| *D06P 5/00* | (2006.01) |
| *B41J 11/00* | (2006.01) |
| *B41J 2/21* | (2006.01) |
| *D06P 5/30* | (2006.01) |
| *C09D 11/322* | (2014.01) |
| *C09D 11/40* | (2014.01) |
| *C09D 11/50* | (2014.01) |
| *C09D 11/54* | (2014.01) |

(52) U.S. Cl.
CPC . *D06P 5/002* (2013.01); *B41J 2/01* (2013.01); *B41J 2/2107* (2013.01); *B41J 11/0015* (2013.01); *C09D 11/322* (2013.01); *C09D 11/40* (2013.01); *C09D 11/50* (2013.01); *C09D 11/54* (2013.01); *D06P 5/30* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ........... 347/100, 96, 95, 101, 102, 20, 21, 88, 347/99, 103; 523/160, 161; 106/31.6, 106/31.13, 31.27
See application file for complete search history.

(56) References Cited

U.S. PATENT DOCUMENTS

| | | | |
|---|---|---|---|
| 5,096,801 A * | 3/1992 | Koya et al. ................. | 430/293 |
| 2002/0143080 A1 | 10/2002 | Yui et al. | |
| 2002/0175982 A1 | 11/2002 | Isago | |
| 2007/0060670 A1 * | 3/2007 | Ellis ........................... | 523/160 |
| 2007/0067928 A1 | 3/2007 | Ellis | |
| 2008/0092309 A1 * | 4/2008 | Ellis et al. ................... | 8/478 |
| 2008/0241397 A1 * | 10/2008 | Kato et al. ................ | 106/31.13 |
| 2008/0268156 A1 * | 10/2008 | Ueno et al. .................. | 427/288 |
| 2010/0231671 A1 * | 9/2010 | Anton et al. ................. | 347/101 |
| 2011/0102497 A1 * | 5/2011 | Sato et al. ..................... | 347/21 |

FOREIGN PATENT DOCUMENTS

| | | |
|---|---|---|
| JP | 63-069684 A | 3/1988 |
| JP | 01-138275 A | 5/1989 |
| JP | 2001-271011 A | 10/2001 |
| JP | 2001-302954 A | 10/2001 |
| JP | 2001-311024 A | 11/2001 |
| JP | 2002-294104 A | 10/2002 |
| JP | 2003-073593 A | 3/2003 |
| JP | 2003-246945 A | 9/2003 |
| JP | 2008-195767 A | 8/2008 |
| JP | 2009-508717 A | 3/2009 |
| WO | 2007-035508 A1 | 3/2007 |

\* cited by examiner

*Primary Examiner* — Manish S Shah
(74) *Attorney, Agent, or Firm* — Nutter McClennen & Fish LLP; John J. Penny, Jr.; Taylor M. Coon

(57) ABSTRACT

There is provided preprocessing liquid for textile printing including: a polyvalent metal compound, resin emulsion, a heat discoloration type coloring material, and water.

8 Claims, No Drawings

PREPROCESSING LIQUID FOR TEXTILE PRINTING, INK SET FOR INK JET TEXTILE PRINTING, INK JET TEXTILE PRINTING METHOD

The entire disclosure of Japanese Application No.: 2012-095391 filed on Apr. 19, 2012 is expressly incorporated by reference herein.

BACKGROUND

1. Technical Field

The present invention relates to preprocessing liquid for textile printing, an ink set for inkjet textile printing which includes the preprocessing liquid for textile printing, and an ink jet textile printing method using the ink set.

2. Related Art

In the related art, various schemes have been used as a recording method for forming an image on a recording medium such as a paper based on an image data signal. According to an ink jet scheme among the various schemes, ink is ejected only to a necessary image part with an inexpensive apparatus to directly form an image on the recording medium, and therefore, it is possible to effectively use the ink at a low running cost. Furthermore, the ink jet scheme is excellent as a recording method since less noise is created.

In recent years, an ink jet textile printing method using a recording method based on the ink jet scheme has attracted attentions. More specifically, attempts have been made in relation to an ink jet textile printing method in which fabric is preprocessed with preprocessing liquid in order to obtain excellent fixability of white ink to a fabric as a kind of a recording medium and obtain excellent abrasion resistance and washing fastness, and thereafter, white ink is ejected to the fabric to form an image, which has high ink glossiness and is excellent in water resistance and abrasion resistance, on the fabric.

For example, JP-A-2008-195767 discloses an ink jet textile printing method in which solid printing is performed on a 100% cotton black fabric, which has been moistened with processing liquid obtained by adding 5 parts by mass of calcium chloride and 5 parts by mass of polyethylene glycol with a mass average molecular weight of 1000 to 90 parts by mass of water and then dried, with water-based white ink for ink jet textile printing with a predetermined composition, and thereafter, the fabric is heated at 180° C. for thirty seconds by using a heat press machine, and the ink is fixed to the fabric (paragraphs [0041], [0069], and [0086] in JP-A-2008-195767).

For example, JP-T-2009-508717 discloses an ink jet textile printing method in which preprocessing solution obtained by adding non-ionic latex polymer to calcium nitrate solution (water-based multivalent cation salt solution) is sprayed to a substantially same region as a region of an intended image to be printed on a T-shirt (an estimated amount of calcium nitrate on the T-shirt before printing is about 5 g/m$^2$), and thereafter, white pigmented ink is printed (paragraphs [0109], [0110], [0112], [0113], and [0120] in JP-T-2009-508717).

However, the ink jet textile printing methods disclosed in JP-A-2008-195767 and JP-T-2009-508717 have a problem that color irregularity obviously appears in an image region on the printed textile, which is obtained by performing textile printing on the fabric with white ink, quality of the printed textile (product) is not easily stabilized, and an yield of satisfactory products is low.

SUMMARY

An advantage of some aspects of the invention is to provide preprocessing liquid for textile printing capable of preventing occurrence of color irregularity in an image region on a printed textile which is obtained by performing textile printing on a fabric with ink.

Another advantage of some aspects of the invention is to provide an ink set which includes the preprocessing liquid for textile printing and white ink.

Another advantage of some aspects of the invention is to provide an ink jet textile printing method using the ink set.

The present inventors made intensive study to achieve the above advantages. First, the preprocessing liquid in the related art disclosed in JP-A-2008-195767 and JP-T-2009-508717 does not contain a coloring material, is in a state of a light opaque white or light white turbidity in a liquid form, and becomes substantially transparent when applied to a fabric. For this reason, an operator who applied such transparent preprocessing liquid to the fabric only knows whether or not the fabric is wet, and cannot check whether the application amount is large or small and whether the preprocessing liquid has been uniformly applied to the fabric. In addition, if the application amount of the preprocessing liquid varies depending on locations on the fabric, an amount of a coloring material in the ink which is made to adhere to the fabric after the preprocessing similarly varies. Therefore, a coloring degree varies, and color irregularity occurs in the printed textile.

Therefore, dying spots (unevenness after textile printing) and variations in a degree of fastness occur due to the application spots (application irregularity) caused by the state of the fabric and the variations in operations of the operator during the application, and the operator cannot check such defects at all until the printed textile is finished (after manufacturing the printed textile). Therefore, there is a problem that quality of obtained printed textiles (products) cannot be easily stabilized and a yield of satisfactory products is low. Thus, it is necessary for the operator to repeatedly apply the preprocessing liquid without knowing whether or not the preprocessing liquid has been uniformly applied in the current situation (application is manually performed by using a roller, a spray, or the like in the related art). However, such operations require long time, and there is a concern that the above problem still remain in addition to the deterioration of operation efficiency and an increase in costs.

As a result of further study by the present inventors based on the result of the above study, the present inventors discovered that it was possible to perform textile printing on a fabric after the preprocessing by ink after checking whether or not the preprocessing liquid has been uniformly applied to some extent as a whole after the preprocessing by causing the preprocessing liquid to contain a coloring material. It was discovered that it was possible to visually check and avoid the application unevenness of the preprocessing liquid, and as a result, it was possible to prevent an appearance defect (color irregularity) of the printed textile. However, if the coloring obviously appears on the fabric after the preprocessing, there is a concern that it is not possible to finally obtain a desired color tone of the printed textile, and there may be a problem in quality of the printed textile. Thus, the present inventors discovered that by causing the preprocessing liquid to include the coloring material with a characteristic of discoloring due to heat (hereinafter, referred to as a "heat discoloration type coloring material") among coloring materials, coloring caused by the heat discoloration type coloring material (substantially) disappeared in the course of ink jet textile printing until a printed textile was obtained, and quality of the printed textile did not deteriorate.

Furthermore, the present inventors discovered that by causing the preprocessing liquid to contain a polyvalent metal compound, resin emulsion, and water in addition to the heat discoloration type coloring material, it was possible to obtain aforementioned excellent fixability of the ink to the fabric and obtain excellent abrasion resistance and washing fastness of the printed textile. In doing so, the present inventor discovered that it was possible to achieve the above advantages by preprocessing liquid for textile printing which contains the polyvalent metal compound, the resin emulsion, the heat discoloration type coloring material, and water, and completed the invention.

That is, aspects of the invention are as follows.

[1] Preprocessing liquid for textile printing including: a polyvalent metal compound; resin emulsion; a heat discoloration type coloring material; and water.

[2] The preprocessing liquid for textile printing according to [1], wherein the heat discoloration type coloring material includes a color forming substance, color developer, and decolorant.

[3] The preprocessing liquid for textile printing according to [2], wherein the color forming substance is leuco dye.

[4] The preprocessing liquid for textile printing according to any one of [1] to [3], wherein the preprocessing liquid produces a color in a state of an environment temperature at which the preprocessing liquid is applied, and an irreversible reaction due to heat occurs and the preprocessing liquid discolors in a state of not less than 100° C.

[5] An ink set for ink jet textile printing including: the preprocessing liquid for textile printing according to any one of [1] to [4]; and ink for ink jet textile printing which contains white pigment.

[6] An ink jet textile printing method using the ink set for ink jet textile printing according to [5], the method including: a preprocessing process in which the preprocessing liquid for textile printing is applied to a fabric; a drying process in which the fabric after the preprocessing process is heated at a temperature of not less than 100° C., and the applied preprocessing liquid for textile printing is dried; and an ink adhesion process in which the ink for ink jet textile printing is made to adhere to the fabric after the drying process.

[7] The ink jet textile printing method according to [6], wherein in the preprocessing process, the preprocessing liquid for textile printing is applied to the fabric using a roller.

DESCRIPTION OF EXEMPLARY EMBODIMENTS

Hereinafter, a detailed description will be given of embodiments for implementing the invention. In addition, the invention is not limited to the embodiment described below, and various modifications can be made within a scope of the gist of the invention.

In the specification, "ink jet textile printing" means recording (printing) ink on a fabric as a kind of recording medium by using the ink jet scheme, and is a kind of ink jet recording. A "recorded object" means an object obtained by recording the ink on the recording medium and forming an image thereon. A "printed textile" is included in the recorded object, and is obtained by recording ink on a fabric as a kind of recording medium and forming an image thereon.

In the specification, "preserving stability" means a characteristic that viscosity does not easily change before and after preserving ink at 60° C. for seven days. "Abrasion resistance" is a characteristic that image is not easily peeled off from the fabric or is not easily scratched when the image is rubbed. "Flexibility" means a characteristic that the image is not easily cracked when the recorded object is stretched. A "chromogenic property" is a characteristic that coloring efficiency of ink printed on a fabric is high and the ink sufficiently forms color. "Washing fastness" is a characteristic that a degree of discoloration and color deterioration due to washing is low.

In the specification, "(meth)acrylate" means at least one of acrylate and corresponding methacrylate, "(meth)acryl" means at least one of acryl and corresponding methacryl, "(meth)acryloyl" means at least one of acryloyl and corresponding methacryloyl.

Preprocessing Liquid for Textile Printing

An embodiment of the invention relates to preprocessing liquid for textile printing. The preprocessing liquid is liquid which is preferably used in ink jet textile printing. The following advantageous effects can be achieved by performing preprocessing on a fabric by using the preprocessing liquid for textile printing according to the embodiment before causing ink to adhere to the fabric and forming an image. First, it is possible to prevent ink bleeding on the fabric. Second, it is possible to achieve excellent fixability of the ink to the fabric and achieve excellent abrasion resistance and washing fastness of the printed textile. Third, since it is possible to confirm whether the preprocessing liquid has been uniformly applied after the preprocessing, and as a result, it is possible to prevent color irregularity of the printed textile. Fourth, since a color of a heat discoloration type coloring material as a color forming constituent which is included in the preprocessing liquid for textile printing disappears in the course of ink jet textile printing until the printed textile is obtained, there is (substantially) no influence of the coloring due to the heat discoloration type coloring material on the printed textile, and it is possible to maintain quality of the printed textile in an excellent state.

The preprocessing liquid for textile printing according to the embodiment contains at least a polyvalent metal compound, a heat discoloration type coloring material, resin emulsion, and water.

Hereinafter, a detailed description will be given of additive (constituents) which is included or can be included in the preprocessing liquid for textile printing.

1. Polyvalent Metal Compound

The preprocessing liquid for textile printing includes a polyvalent metal compound. Since the polyvalent metal compound has a property of condensing pigment in the ink, the polyvalent metal compound can suppress the pigment permeating the inside of fiber of the fabric and cause the pigment to remain on the textile printed surface of the fabric.

The polyvalent metal compound is not particularly limited as long as the polyvalent metal compound is configured by bivalent or higher-valent ions and anions bonded to the polyvalent metal ions. Examples of the polyvalent metal compound include a titanium compound, a chromium compound, a copper compound, a cobalt compound, a strontium compound, a barium compound, an iron compound, an aluminum compound, a calcium compound, and a magnesium compound, and salts thereof (polyvalent metal salts).

One or more kinds selected from a group consisting of the aluminum compound, the calcium compound, the barium compound, and the magnesium compound are preferable, one or more kinds selected from a group consisting of the calcium compound, the barium compound, and the magnesium compound are more preferable, and at least any of the calcium compound and the magnesium compound is further preferable, and the calcium compound is further more preferable since it is possible to effectively condense the pigment among the polyvalent metal compounds.

Specific examples of the polyvalent metal compound include inorganic pigment such as calcium carbonate such as heavy calcium carbonate and light calcium carbonate, calcium chloride, calcium bromide, calcium formate, calcium nitrate, calcium acetate, calcium sulfate, calcium silicate, chalk, kaolin, calcined clay, talc, barium chloride, barium acetate, barium bromide, barium sulfate, barium nitrate, barium propionate, magnesium chloride, magnesium acetate, magnesium bromide, magnesium nitrite, magnesium sulfate, magnesium silicate, aluminum chloride, aluminum sulfate, aluminum nitrite, aluminum silicate, aluminum hydroxide, alumina, copper chloride, copper nitrate, zinc oxide, zinc sulfide, zinc carbonate, zinc acetate, zinc bromide, stannous sulphate, stannic sulfate, strontium chloride, strontium bromide, strontium nitrate, titanium dioxide, synthetic silica, sericite, white carbon, saponite, calcium montmorillonite, sodium montmorillonite, and bentonite, and organic pigment such as acrylic plastic pigment, polyethylene, and a urea polymer substance.

Among the specific examples, calcium chloride, calcium sulfate, barium chloride, barium sulfate, magnesium chloride, and magnesium sulfate are preferable, and calcium chloride, barium chloride, and magnesium chloride are more preferable since the pigments are excellent in a condensing performance, have excellent compatibility with other mixed constituents (a hydrophilic constituent and a hydrophobic constituent), and can effectively prevent deterioration and discoloration of the fabric after thermal treatment.

One kind or two or more kinds of the polyvalent metal compound may be used alone or in combination.

The content of the polyvalent metal compound is preferably from 1% by mass to 15% by mass, and more preferably from 5% by mass to 12% by mass with respect to the total mass (100% by mass) of the preprocessing liquid for textile printing. If the content is within the above range, trace after applying the preprocessing liquid for textile printing is unnoticeable, and it is possible to obtain sufficient whiteness for the printed textile when the textile printing is performed with white ink.

2. Heat Discoloration Type Coloring Material

The preprocessing liquid for textile printing includes a heat discoloration type coloring material. The heat discoloration type coloring material is a coloring material with a characteristic of causing discoloration due to heat as described above. The heat discoloration type coloring material forms color when whether the preprocessing liquid for textile printing has been uniformly applied to the fabric as a whole to some extent is checked after the preprocessing, that is, when presence and a degree of application irregularity are checked. Thereafter, the heat discoloration type coloring material discolors during the thermal treatment, and coloring caused by the heat discoloration type coloring material becomes unnoticeable in the printed textile.

In general preprocessing, the preprocessing liquid for textile printing is applied to the fabric, heating treatment is performed thereon, moisture included in the preprocessing liquid for textile printing is evaporated, and a remaining solid constituent is sufficiently fixed to the fabric. Thus, since it is possible to cause the coloring material to discolor in the heating treatment by using the heat discoloration type coloring material, it is not necessary to provide additional process unlike a coloring material which is caused to discolor by another mechanism. Therefore, it is possible to improve operation efficiency, for example, by simplifying the process.

Here, "discoloration" means that the color after the coloring caused by the coloring material changes to an extent to which the color becomes unnoticeable on the fabric after the preprocessing as a result of an thermal action. Therefore, "discoloration" has meaning including color deterioration due to heat as well as a change from a colored state to a colorless state (however, limited to color deterioration to an extent to which the coloring becomes unnoticeable on the fabric after the preprocessing). In addition, "discoloration" preferably means a change to the colorless state, that is, decoloration since the coloring becomes completely unnoticeable on the fabric after the preprocessing.

In addition, the discoloration caused by heat, particularly decoloration is preferably implemented through a thermal irreversible reaction since it is possible to continuously cause the coloring caused by the coloring material to be unnoticeable. Among thermal irreversible reactions, a case where the color is formed at an environment temperature at which the preprocessing liquid is applied, an irreversible reaction caused by heat occurs in a state of not less than 100° C., and discoloration occurs is more preferable. In such a case, it is possible to reliably check whether the preprocessing liquid for textile printing has been uniformly applied to the fabric after the preprocessing, and also cause the heat discoloration type coloring material to decolor into a (substantially) colorless state by the heating treatment performed in the ink jet textile printing method after the checking. Although "the environment temperature at which the preprocessing liquid is applied" is not particularly limited as long as the environment temperature is a room temperature, the environment temperature is preferably not more than 40° C., and more preferably from 10° C. to 40° C.

In order to reliably achieve decoloration, the heat discoloration type coloring material preferably includes a color forming substance, a color developer, and a decolorant. Hereinafter, a detailed description will be given of the color forming substance, the color developer, and the decolorant.

2-1. Color Forming Substance

Examples of the color forming substance include electron donating organic substances such as, leucoauramine, diarylphthalide, polyarylcarbinol, acylauramine, arylauramine, rhodamine B lactam, indoline, spiropyran, and fluoran. Specific examples include crystal violet lactone (CVL), malachite green lactone, 2-anilino-6-(N-cyclohexyl-N-methylamino)-3-methylfluoran, 2-anilino-3-methyl-6-(N-methyl-N-propylamino)fluoran, 3-[4-(4-phenylaminophenyl)aminophenyl]amino-6-methyl-7-chlorofluoran, 2-anilino-6-(N-methyl-N-isobutylamino)-3-methylfluoran, 2-anilino-6-(dibuthylamino)-3-methylfluoran, 3-chloro-6-(cyclohexylamino)fluoran, 2-chloro-6-(diethylamino)fluoran, 7-(N,N-dibenzylamino)-3-(N,N-diethylamino)fluoran, 3,6-bis(diethylamino)fluoran, γ-(4'-nitroanilino)lactam, 3-diethylaminobenzo[a]-fluoran, 3-diethylamino-6-methyl-7-aminofluoran, 3-diethylamino-7-xilidinofluoran, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl)phthalide, 3-diethylamino-7-chloroanilinofluoran, 3-diethylamino-7,8-benzofluoran,3,3-bis(1-n-buthyl-2-methylindole-3-yl)phthalide, 3,6-dimethylethoxyfluoran, 3-diethylamino-6-methoxy-7-aminofluoran, DEPM, ATP, ETAC, 2-(2-chloroanilino)-6-dibuthylaminofluoran, crystal violet carbinol, malachite green carbinol, N-(2,3-dichlorophenyl)leucoauramine, N-benzoylauramine, rhodamine B lactam, N-acetylauramine, N-phenylauramine, 2-(phenyliminoethanediylidene)-3,3-dimethylindoline, N,3,3-trimethylindolinobenzospiropyran, 8'-methoxy-N,3,3-trimethylindolinobenzospiropyran, 3-diethylamino-6-methyl-7-chlorofluoran, 3-diethylamino-7-methoxyfluoran, 3-diethylamino-6-benzyloxyfluoran, 1,2-benzo-6-diethylaminofluoran, 3,6-di-p-toluidino-4,5-dimethylfluoran, phenylhydrazide-γ-lactam, and 3-amino-5-methylfluoran.

Among the above examples, leuco dye is preferable since a coloring amount is sufficient at the environment temperature at which the preprocessing liquid is applied and the leuco dye has a sufficient performance for causing decoloration after the heating.

The leuco dye is a compound which includes a lacton ring in a molecule. Examples of classification of the leuco dye include a triphenylmethane system, a diphenylmethane system, a spiropyran system, a fluoran system, and a rhodamine lactam system.

Although commercially available products of the leuco dye are not limited to the following examples, it is possible to exemplify "CVL", "Green DCF", "Vermilion DCF", "Red DCF", "Orange DCF", "TH-106", "TH-107", "TH-108", "TH-109", "CF-51", "D.L.M.B." (all of which are names of products manufactured by Hodogaya Chemical Co., Ltd.), "DEBN", "RED 500", "RED 520", "S-205", "Black 100", "Black 202", "Black 30Black 78", "Green 300", "PINK 535" (all of which are names of products manufactured by Yamada Chemical Co., Ltd.), "ODB", "ODB-2", "ODB-7", "Black-15", "Black-173", "Blue-63", "Blue-502", "Green-40", "Red-3", "Red-40", "MNSP", "LCV", "GN-2", "GN-169", "GN-118" (all of which are names of products manufactured by Yamamoto Chemicals Inc.), "PERGASCRIPT REDI-6B", and "PERGASCRIPT GREENI-2GN" (all of which are names of products manufactured by BASF Japan Ltd.).

One kind or two or more kinds of the color forming substances may be used alone or in combination. It is possible to obtain various coloring states by appropriately selecting the color forming substance and to thereby handle multiple colors.

The content of the color forming substance is preferably from 0.1% by mass to 2% by mass with respect to the total mass (100% by mass) of the preprocessing liquid for textile printing. If the content is within the above range, it is possible to achieve an excellent coloring performance at the environment temperature at which the preprocessing liquid is applied and sufficiently cause decoloration after the heating, and therefore, the color does not remain on the fabric.

2-2. Color Developer

Although the color developer is not limited to the following examples, it is possible to exemplify acid compounds such as phenol, phenol metal salt, carboxylic acid metal salt, benzophenone, sulfonic acid, sulfonate, phosphoric acid, phosphoric acid metal salt, acid ester phosphate, acid ester phosphate metal salt, phosphorous acid, and phosphorous acid metal salt. Specific examples include gallic acid; ester gallate such as methyl gallate, ethyl gallate, n-propyl gallate, i-propyl gallate, and buthyl gallate; dihydroxybenzoic acid such as 2,3-dihydroxybenzoic acid, and methyl 3,5-dihydroxybenzoate and esters thereof; acetophenone derivatives such as 2,4-dihydroxyacetophenone, 2,5-dihydroxyacetophenone, 2,6-dihydroxyacetophenone, 3,5-dihydroxyacetophenone, and 2,3,4-trihydroxyacetophenone; benzophenone derivatives such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, and 2,3,4,4'-tetrahydroxybenzophenone; biphenol such as 2,4'-biphenol and 4,4'-biphenol; and polyvalent phenol such as 4-[(4-hydroxyphenyl)methyl]-1,2,3-benzenetriol, 4-[(3,5-dimethyl-4-hydroxyphenyl)methyl]-1,2,3-benzenetriol, 4,6-bis[(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)bis(1,2-benzenediol)], 4,4',4"-ethylidenetrisphenol, 4,4'-(1-methylethylidene)bisphenol, and methylidenetris-p-cresol.

Among color developers, compounds which include a phenolic hydroxyl group in a molecule such as a hydroxyacetophenone system, a hydroxybenzophenone system, an ester gallate system, a benzenetriol system, a bisphenol system, a triphenol system, and a cresol system, and compounds which include a phosphate group in a molecule such as a phosphate group, monoester phosphate, and diester phosphate are preferably exemplified.

Specific examples of the compounds which include a phenolic hydroxyl group in a molecule include dihydroxyacetophenone, trihydroxyacetophenone, dihydroxybenzophenone, trihydroxybenzophenone, tetrahydroxybenzophenone, dihydrobenzoic acid, bisphenol, hydroxyphenylalkyl-benzotriazole, methylidenetris-p-cresol, and alkylester gallate. In addition, specific examples of the compound which includes a phosphate group in a molecule include monoalkyl phosphate group ester, dialkyl phosphate group ester, monoalkyl polyoxyethylene phosphate group ester, and dialkyl polyoxyethylene phosphate group ester. In addition, examples of the alkyl group in the specific examples include a methyl group, an ethyl group, a propyl group, a buthyl group, a nonyl group, a lauryl group, an oleyl group, and a stearyl group.

Examples of commercially available color developers include Phosphanol series (a name of a product manufactured by Toho Chemical Industry Co., Ltd.), Prisurf series (a name of a product manufactured by Dai-ichi Kogyo Seiyaku Co., Ltd.), and Nyucol 565-PS (a name of a product manufactured by Nippon Nyukazai Co., Ltd.).

One kind or two or more kinds of the color developers may be used alone or in combination.

The content of the color developer is preferably from 0.1% by mass to 2% by mass with respect to the total mass (100% by mass) of the preprocessing liquid for textile printing. If the content is within the above range, it is possible to achieve an excellent coloring performance at the environment temperature at which the preprocessing liquid is applied and sufficiently cause decoloration after the heating, and therefore, the color does not remain on the fabric. In addition, a rate of the content of the color developer with respect to the content of the color forming substance (leuco dye, in particular) differs depending on valence of the color developer. The rate of not less than one chemical equivalent is applicable, and the rate is preferably within a range from one chemical equivalent to three chemical equivalent. If the rate is within the above range, it is possible to achieve a more excellent coloring performance at the environment temperature at which the preprocessing liquid is applied.

2-3. Decolorant

The discolorant has a function of bonding with the free color developer, which has been disengaged by overheating from the chemical bonding in the coloring state caused by a chemical reaction between the color forming substance and the color developer, by a chemical reaction, and causing decoloration. The decolorant is basic and has a function of decoloring the electron donating organic substance.

The decolorant may be a low-molecular organic material such as a sterol compound, cyclic sugar alcohol, and derivatives thereof, or may be a high-molecular decolorant. In addition, the decolorant may be contained in an image forming material or may be contained in an erasing solvent.

Specific examples of decolorant include animal sterin, plant sterin, and fugal sterin. Examples of animal sterin include cholesterol, lanosterol, lanostanediol, agnosterol, cholestanol, coprostanol, ostreasterol, actiniasterol, spongosterol, and clionasterol. Examples of bile acid include cholanic acid, cholic acid, hyodeoxycholic acid, and lithocholic acid. Examples of plant sterin include stigmasterol, α-sitosterol, β-sitosterol, γ-sitosterol, brassicasterol, and vitamin D. Examples of fugal sterin include ergosterin. One kind or two or more kinds among the examples can be used. In addition, a material which is originally a mixture, such as lanolin alcohol, may be used.

Examples of the decolorant include cholic acid, lithocholic acid, testosterone, cortisone, and derivarives thereof, which have high compatibility with the color developer. Specific examples thereof include cholic acid, cholic acid methyl ester, cholic acid sodium, lithocholic acid, lithocholic acid methyl ester, lithocholic acid sodium, hyodeoxycholic acid, hyodeoxycholic acid methyl ester, testosterone, methyltestosterone, 11α-hydroxymethyltestosterone, hydrocortisone, cholesterolmethylcarbonate, and α-cholestanol. Among the examples, decolorant which includes two or more hydroxyl groups is particularly preferable.

Examples of the decolorant also include cyclic sugar alcohol and a derivative thereof, which are compound exhibiting high amorphous nature and functioning for suppressing phase dissociation (phase dissociation inhibitor). Specific examples thereof include D-glucose, D-mannose, D-galactose, D-fructose, L-sorbose, L-rhamnose, L-fucose, D-ribodesose, α-D-glucose=pentaacetate, acetoglucose, diacetone-D-glucose, D-glucuronic acid, D-galacturonic acid, D-glucosamine, D-fructosamine, D-isosaccharic acid, vitamin C, erythorbic acid, trehalose, saccharose, maltose, cellobiose, gentiobiose, lactose, melibiose, raffinose, gentianose, melezitose, stachyose, methyl=α-glucopyranoside, salicin, amygdalin, euxanthinic acid, confectioner granulated sugar, granulated sugar, and white superior soft sugar. One kind or two or more kinds among the examples can be used.

Examples of the decolorant also include a five-membered or more-membered ring non-aromatic cyclic compound which includes a hydroxyl group other than cyclic sugar alcohol or a derivative of cyclic sugar alcohol as a phase dissociation inhibitor with low amorphous nature. Specific examples thereof include alicyclic monovalent such as cyclododecanol, hexahydrosalicylic acid, menthol, isomenthol, neomenthol, neoisomenthol, carvomenthol, α-carvomenthol, piperitol, α-terpineol, β-terpineol, γ-terpineol, 1-p-menthene-4-ol, isopulegol, dihydrocarveol, and carveol; alicyclic polyvalent alcohol such as 1,4-cyclohexanediol, 1,2-cyclohexanediol, phloroglucitol, quercitol, inositol, 1,2-cyclododecanediol, quinic acid, 1,4-terpine, 1,8-terpine, pinol hydrate, and abetulin; polycyclic alcohol derivatives such as borneol, isoborneol, adamantanol, norborneol, fenchol, camphor, and isosorbide; and a derivative of cyclic sugar alcohol such as 1,2:5,6-diisopropylydene-D-mannitol. One kind or two or more kinds among the examples can be used. It is preferable to use both the phase dissociation inhibitor with high amorphous nature and the phase dissociation inhibitor with low amorphous nature.

Examples of the high-molecular decolorant (polymer or oligomer) include starch which uses grain as a raw material (such as potato starch and corn starch), dogtooth violet starch, wheat flour, and rice flour. In addition, decolorant which includes a soy protein constituent can also be used.

In addition to the above examples, synthetic high-molecular decolorant (polymer or oligomer) can also be used. Specific examples thereof include cellulose, cellulose derivatives (such nitrocellulose, ethylcellulose, and acetylcellulose), polyacrylic acid, polymethacrylic acid, polybiphenylacrylate, polyacrylamide, polymethacrylamide, polyvinylester (such as polyvinyl acetate), polyphenylene, polyethersulfone, polyetheretherketone, polysulfone, polyvinylpyrrolidone, polyamide, polybenzimidazole, polyphenyleneether, polyphenylene sulfide, polycarbonate, polydivinylbenzene, and melamine resin. In addition to the above examples, it is also possible to use styrene.acrylate copolymer, styrene-.acrylic acid copolymer, styrene.methacrylic acid copolymer, and styrene.epoxy-modified styrene copolymer, all of which has a polar monomer mass ratio of not less than 20% by mass.

It is preferable to use one or more kinds selected from a group consisting of bile acid, bile acid ester, a steroid system compound and starch since bile acid, bile acid ester, a steroid system compound, and starch are more excellent in a decoloration performance among the above examples. The bile acid means steroidal hydroxylic acid which contains cholanic acid such as cholic acid, hydroxycholic acid, lithocholic acid, or deoxycholic acid as a parent organism. In addition, bile acid ester means a bile acid ester compound, and examples of bile acid ester include cholic acid methyl and hydroxycholic acid methyl.

According to the embodiment, a material which is basically dissolved slightly in the erasing solvent, and generally polymer is preferable as a material which acts to suppress leakage of the color forming substance, the color developer, and the decolorant from the image forming material due to invasion of the erasing solvent, and it is possible to exemplify a binder, a shell material for a microcapsule, and the like which has an effect of satisfactorily sealing other constituents.

It is preferable to use the following solvent when the image forming material according to the embodiment is brought into contact with solvent (which includes the decolorant in some cases) to erase the color. That is, the solvent preferably has a characteristic (A) of helping formation of hydrogen bonding between the color developer and the decolorant and further a characteristic (B) of exhibiting high affinity with a matrix agent (binder resin or wax) and being easily permeated inside the image forming material. Solvent which has the characteristic (A) can be used alone. Two or more kinds of solvent may be mixed to have the two characteristics.

As the erasing solvent, erasing solvent which can uniformly dissolves the color forming substance and the color developer therein at a concentration of not less than 0.1 mmol/L is preferably used. This is because solvent with higher solubility makes it easier to diffuse the color forming substance and the color developer and promotes compatibility between the color developer and the decolorant and a satisfactory erasing state can be obtained.

The melting point of the decolorant is preferably not less than 80° C. or more in order to obtain a satisfactory image preserving property. In addition, it is preferable to use decolorant with high reactivity with the used color developer at a high temperature of not less than 100° C.

One kind or two or more kinds of decolorant may be used alone or in combination.

The content of the decolorant is preferably from 0.1% by mass to 4% by mass with respect to the total mass (100% by mass) of the preprocessing liquid for textile printing. If the content is within the above range, it is possible to obtain a satisfactory decoloration performance and suppress the decolorant itself coloring or leaving trace.

The heat discoloration type coloring material may be included in resin emulsion described below. In such a case, the content of the resin emulsion including the heat discoloration type coloring material is preferably from 5% by mass to 40% by mass, and more preferably from 10% by mass to 25% by mass with respect to the total mass (100% by mass) of the preprocessing liquid for textile printing. If the content is within the above range, it is possible to sufficiently exhibit enhanced effects such as fastness caused by the addition of the resin emulsion and reduce viscosity of the preprocessing liquid, and therefore, application irregularity is not easily generated.

3. Resin Emulsion

The preprocessing liquid for textile printing includes resin emulsion. Since the resin emulsion fixes the pigment to the recording medium by mutually fusing the resin and fusing the resin and the pigment, respectively, as the preprocessing liquid for textile printing is dried, it is possible to achieve more satisfactory abrasion resistance and washing fastness of the image part on the printed textile.

When the resin emulsion is included in the preprocessing liquid for textile printing, the resin emulsion sufficiently fixes the preprocessing liquid for textile printing and the ink on the fabric by forming a resin coating film on the fabric and enhance abrasion resistance of the printed textile. Therefore, the resin emulsion is preferably thermoplastic resin.

At least one of the non-ionic resin emulsion and cationic resin emulsion is preferable among the above resin emulsion since it is possible to effectively prevent condensing with the polyvalent metal compound.

Although the non-ionic resin emulsion (non-ionic high-molecular particles) among the above emulsion is not limited to the following examples, specific examples thereof include emulsion of acrylic resin, styrene-acrylic resin, urethane resin, ester resin, olefin resin, vinyl acetate resin and the like.

Examples of commercially available non-ionic resin emulsion include Movinyl 966A (Tg=−30° C., solid content: 45% by mass), Movinyl 731 (Tg=0° C., solid content: 46% by mass), Movinyl 780 (Tg=20° C., solid content: 46% by mass) (all of which are names of products manufactured by Nichigo-Movinyl Co., Ltd.).

In addition, although the cationic resin emulsion (cationic high-molecular particles) is not limited to the following examples, the specific examples thereof include emulsion of acrylic resin, styrene-acrylic resin, urethane resin, ester resin, olefin resin, vinyl acetate resin, and the like.

A particle of the cationic resin emulsion preferably includes a functional group such as quaternary ammonium, pyridinium, and quaternary phosphonium on the surface of the particle. Since the functional group is dissociated in water and exhibits positive charge, the resin emulsion can more stably maintain a dispersed state without condensing due to electrostatic repulsion.

In addition, a glass-transition temperature (Tg) of the resin emulsion is preferably not more than 20° C. and more preferably not more than 0° C. since satisfactory texture of the fabric can be obtained. Here, Tg in this specification can be obtained by a thermal analysis method such as a DSC curve based on JIS K 7121.

The resin emulsion is preferably obtained by emulsion polymerization method since it becomes easier to adjust a particle size of the emulsion. In addition, when particularly excellent water resistance and washing fastness are required, it is preferable to introduce cross-linking agent capable of thermally cross-linking the resin emulsion within a range that does not compromise the texture.

In addition, a 50% average particle size (D50) of the resin emulsion is preferably not more than 500 nm, and more preferably not more than 300 nm. If D50 is within the above range, it is possible to uniformly disperse the resin emulsion particles in the preprocessing liquid for textile printing. In addition, the lower limit of D50 is preferably 100 nm since it is possible to achieve more excellent abrasion resistance of the printed textile. In addition, a method for measuring the 50% average particle size will be described later.

One kind or two or more kinds of the resin emulsion may be used alone or in combination.

The content as solid content of the resin emulsion is preferably from 1% by mass to 50% by mass, and more preferably from 2% by mass to 30% by mass, and further more preferably from 5% by mass to 15% by mass with respect to the total mass (100% by mass) of the preprocessing liquid for textile printing. If the content is within the above range, it is possible to sufficiently exhibit the improved effects such as fastness by addition of the resin emulsion and also reduce the viscosity of the preprocessing liquid and therefore, application using a roller and a spray is facilitated.

4. Water

The preprocessing liquid for textile printing according to the embodiment is water-based liquid and includes water-based solvent. Examples of the water-based solvent include water and water-soluble organic solvent. Water is not particularly limited, and it is possible to use pure water or ultrapure water such as ion-exchanged water, ultrafiltrated water, reverse osmosis water, and distilled water. Although the content of water is not particularly limited and may be appropriately set as necessary, water is preferably contained at a rate from 70% by mass to 95% by mass with respect to the total mass (100% by mass) of the preprocessing liquid for textile printing.

5. Other Additives (Constituents)

The preprocessing liquid for textile printing may further include the polyvalent metal compound, the heat discoloration type discoloring material, the resin emulsion, and water additive (hereinafter, referred to as "other additives"). Other additives are not limited to the following examples, the examples thereof include a cationic substance, paste, pH adjuster, reduction inhibitor, sequestering agent, moisturizer, penetrant, and antifoaming agent which has a condensing function in the same manner as the polyvalent metal compound.

Although the cationic substance among the above examples is not limited to the following examples, examples thereof include cationic high molecule which is soluble in water and is positively charged in water, such as polyamine and a quaternary salt of polyamine.

Specific examples of polyamine and the quaternary salt of polyamine include polyethylenimine, polyallylamine, polyvinylamine, a condensation product from dicyandiamide and polyalkylene polyamine, a condensation product from polyalkylene polyamine, dicyandiamide, and ammonium salt, a condensation product from dicyandiamide and formalin, an epichlorohydrin.dialkylamine addition-polymerized substance, a diallyldimethylammonium chloride polymerized substance, a diallyldimethylammonium chloride.$SO_2$ copolymerized substance, polyvinylimidazole, a vinylpyrrolidone.vinylimidazole copolymerized substance, polyvinylpyridine, polyamidine, chitosan, cationized starch, a vinylbenzyltrimethylammonium chloride polymerized substance, a (2-methacryloyloxyethyl)trimethylammonium chloride polymerized substance, and a dimethylaminoethyl methacrylate polymerized substance.

One kind or two or more kinds of the cationic substances may be used alone or in combination. The content of the cationic substances is preferably from 0.5% by mass to 10% by mass with respect to the total mass (100% by mass) of the preprocessing liquid for textile printing.

Although the paste among the above examples is not limited to the following examples, the examples thereof include starch substances of corn and wheat, cellulose system substances such as carboxymethylcellulose and hydroxymethylcellulose, polysaccharide such as sodium alginate, arabic gum, locust bean gum, trant gum, guar gum, and tamarind seed, protein such as gelatin and casein, natural water-soluble high molecules such as tannin and lignin, and water-soluble high molecules such as a polyvinyl alcohol system compound, a polyethylene oxide system compound, an acrylic acid system compound, and a maleic anhydride system compound.

One kind or two or more kinds of the paste may be used alone or in combination. The content of the paste is preferably not more than 20% by mass with respect to the total mass (100% by mass) of the preprocessing liquid for textile printing. If the content is within the above range, it is possible to reduce the viscosity of the ink to a level in which it is possible to preferably perform roller application or spray application.

According to the embodiment, it is possible to provide preprocessing liquid for textile printing capable of preventing occurrence of color irregularity in an image region on a printed textile which is obtained by performing textile printing on a fabric with ink as described above. In addition, since it is possible to check whether the preprocessing liquid for textile printing has been uniformly applied to the fabric after the preprocessing or before the printing and to thereby (substantially) uniformly apply the preprocessing liquid to the fabric in the preprocessing, and the coloring caused by the preprocessing liquid for textile printing becomes unnoticeable if heating treatment is performed after the preprocessing, it is possible to obtain a printed textile with excellent quality.

More specifically, since it is possible to recognize application spots of the preprocessing liquid for textile printing before the printing by causing the preprocessing liquid for textile printing to include the coloring material (heat discoloration type coloring material which causes discoloration (decoloration) by heat and checking whether the preprocessing liquid for textile printing has been uniformly applied before the printing, it is possible to prevent occurrence of color spots and variations in fastness and to thereby realize both stabilization of the quality of the textile printing and high yield of satisfactory products. In addition, since the coloring material which causes discoloration (decoloration) by heat is used and the coloring caused by the preprocessing liquid for textile printing becomes unnoticeable (disappears) on the printed textile as a final product, there is no problem in the appearance resulted from the coloring.

Ink Set for Ink Jet Textile Printing

An embodiment of the invention relates to an ink set for ink jet textile printing (hereinafter, also simply referred to as an "ink set"). The ink set for ink jet textile printing includes the preprocessing liquid for textile printing according to the above embodiment and ink for ink jet textile printing which contains white pigment as will be described later.

Since white ink among various kinds of ink is often used for the purpose of hiding a fabric or forming a base layer to which non-white ink is adhered, it is necessary to cause the pigment to remain as uniformly as possible on a textile printed surface. Thus, since it is possible to (substantially) uniformly apply the white ink to the fabric if the preprocessing liquid for textile printing according to the above embodiment is used, it is possible to cause the pigment to (substantially) uniformly remain on the textile printed surface and thereby to achieve a large effect in terms of suppressing color irregularity by using the preprocessing liquid for textile printing in the preprocessing before the textile printing (printing).

Ink for Ink Jet Textile Printing

An embodiment of the invention relates to ink for ink jet textile printing used in the ink set for ink jet textile printing according to the above embodiment (hereinafter, also simply referred to as "ink" or an "ink composition"). The ink for ink jet textile printing includes at least white pigment.

Hereinafter, a detailed description will be given of additives (constituents) which are included or can be included in the ink composition.

1. White Pigment

The ink composition according to the embodiment includes white pigment. Since it is necessary to increase an additive amount of the resin emulsion when the white pigment among various kinds of pigment is used, a problem that reserving stability deteriorates due to the resin emulsion often occurs. Therefore, it is significantly necessary to solve the problem in the case of white pigment constituting a white ink composition, in particular.

Although the white pigment included in the white ink composition is not limited to the following examples, the examples thereof include white inorganic pigment such as titanium oxide, zinc oxide, zinc sulfide, antimony oxide, and zirconium oxide. In addition to the above white inorganic pigment, it is also possible to use white organic pigment such as white hollow resin particles and high-molecular particles.

Color indexes (C.I.) of the white pigment are not limited to the following examples, the examples thereof include C.I. Pigment White 1 (lead carbonate basic), 4 (zinc oxide), 5 (mixture of zinc sulfide and barium sulfate), 6 (titanium oxide), 6:1 (titanium oxide containing another kind of metal oxide), 7 (zinc sulfide), 18 (calcium carbonate), 19 (clay), 20 (mica titanium), 21 (barium sulfate), 22 (natural barium sulfate), 23 (gloss white), 24 (alumina white), 25 (plaster), 26 (magnesium oxide.silicon oxide), 27 (silica), and 28 (anhydrous calcium silicate).

Among the above examples, titanium oxide is preferable since titanium oxide is excellent in a chromogenic property, a hiding property, and dispersed particle sizes and satisfactory visibility (brightness) can be obtained.

Among various kinds of titanium oxide, rutile type titanium oxide, which is typical white pigment, is preferable. It is possible to use self-manufactured rutile type titanium oxide or commercially available rutile type titanium oxide. Examples of industrial manufacturing methods in a case of the self-manufactured rutile type titanium oxide (powder form) include a sulfuric acid method and a chlorine method which have been known in the related art.

Examples of commercially available rutile type titanium oxide include rule type products such as Tipaque (registered trademark) CR-60-2, CR-67, R-980, R-780, R-850, R-980, R-630, R-670, and PF-736 (all of which are names of products manufactured by Ishihara Sangyo Kaisha, Ltd.).

The 50% average particle size of titanium oxide (hereinafter, also referred to as "D50") is preferably from 50 nm to 500 nm, and more preferably from 150 nm to 350 nm. If D50 is within the above range, it is possible to obtain excellent abrasion resistance (of an image) of the printed textile and visibility of the image and to thereby form an image with high quality.

Here, the "50% average particle size of titanium oxide" in this specification means D50 of titanium oxide which is present in the ink composition instead of D50 of titanium oxide before preparing the ink composition. In addition, the "50% average particle size" in this specification means a 50% average particle size in terms of a sphere based on a dynamic light scattering method and is a value obtained as follows.

Particles in a dispersion medium are irradiated with light, and generated diffractive scattered light is measured by detectors arranged at front, side, and back locations of the dispersion medium. The particles which originally have indefinite shapes are assumed to have a spherical shape by using the obtained measured values, a cumulative curve is obtained by regarding a total content of a particle group, which has been converted to a sphere with the same content as the content of the particles, as 100%, and at that time, a point at which the cumulative value is 50% is regarded as the "50% average particle size in terms of a sphere based on the dynamic light scattering method".

It is preferable to use titanium oxide, on which surface treatment with alumina silica has been performed, in order to suppress a photocatalyst action when titanium oxide is used as the white pigment. The amount of surface treatment (the amount of alumina silica) on this occasion is preferably from about 5% by mass to about 20% by mass with respect to the total mass (100% by mass) of the white pigment, on which the surface treatment has been performed.

The content of the white pigment is preferably from 1% by mass to 30% by mass, and more preferably from 1% by mass to 15% by mass with respect to the total mass (100% by mass) of the ink composition though preferable content differs depending on a type of used pigment, in order to secure a satisfactory chromogenic property. Particularly, the content of titanium oxide is preferably from 1% by mass to 20% by mass, and more preferably from 5% by mass to 13% by mass with respect to the total mass (100% by mass) of the ink composition since the titanium oxide does not easily settle out and is excellent in a hiding property and color reproducibility (on a black-based fabric, in particular).

One kind or two or more kinds of the white pigment may be used alone or in combination.

In addition, pigment which shows colors other than white may be included in the white ink composition in a range that does not compromise the purpose of the invention.

2. Pigment Dispersion

The above pigment is preferably present in a dispersed state in the ink composition, that is, as pigment dispersion. Here, the pigment dispersion in this specification has a meaning including pigment dispersed liquid and pigment slurry (low-viscosity water-based dispersion).

D50 of the white pigment dispersion is preferably from 100 nm to 600 nm, and more preferably from 200 nm to 500 nm. If D50 is not less than 100 nm, it is possible to obtain a satisfactory hiding property and a chromogenic property. If D50 is not more than 1 μm, it is possible to obtain both satisfactory fixability and ejection stability of the ink.

Although the pigment dispersion is not limited to the following examples, examples thereof include self-dispersion type pigment and polymer dispersion type pigment.

2-1. Self-Dispersion Type Pigment

The self-dispersion type pigment is pigment which can be dispersed or dissolved in water-based medium without any dispersant. Here, "dispersed or dissolved in water-based medium without any dispersant" means a state that the pigment is stably present in the water-based medium by a hydrophilic group on the surface thereof without using dispersant for dispersing the pigment. Therefore, there is substantially no foaming due to a decrease in an antifoaming property caused by the dispersant, and ink which is excellent in ejection stability can be easily prepared. In addition, since it is possible to suppress a significant increase in the viscosity caused by the dispersant and to thereby contain more pigment and sufficiently increase printing concentration, handling is facilitated.

The hydrophilic group is one or more hydrophilic groups selected from a group consisting of —OM, —COOM, —CO—, —$SO_3M$, —$SO_2M$, —$SO_2NH_2$, —$RSO_2M$, —$PO_3HM$, —$PO_3M_2$, —$SO_2NHCOR$, —$NH_3$, and —$NR_3$.

In these equations, M represents a hydrogen atom, alkali metal, ammonium, a phenyl group which may include a substituent, or organic ammonium, and R represents an alkyl group with 1 to 12 carbon atoms or a naphthyl group which may include a substituent. In addition, M and R are independently selected.

The self-dispersion type pigment is manufactured by bonding (grafting) the hydrophilic group to the surface of the pigment by performing physical treatment or chemical treatment on the pigment. Examples of the physical treatment include vacuum plasma treatment. In addition, examples of the chemical treatment include a wet oxidation method for oxidizing the pigment by oxidant in water and a method in which a carboxyl group is bonded via a phenyl group by bonding p-aminobenzoic acid to the pigment surface.

2-2. Polymer Dispersion Type Pigment

The polymer dispersion type pigment is pigment which can be dispersed through polymer dispersion. Although polymer which is used in the polymer dispersion type pigment is not limited to the following examples, a glass-transition temperature (Tg) of the dispersion polymer used in dispersing the pigment is preferably not more than 55° C., and more preferably not more than 50° C. If Tg is not more than 55° C., it is possible to obtain satisfactory fixability of the ink.

In addition, the weight-average molecular weight of the polymer based on gel permeation chromatography (GPC) is preferably not less than 10000 and not more than 200000. In doing so, it is possible to obtain more satisfactory reserving stability of the ink.

Here, the weight-average molecular weight (Mw) in this specification can be measured as a weight-average molecular weight in terms of polystyrene based on gel permeation chromatography (GPC) using an L7100 system manufactured by Hitachi, Ltd.

As the polymer, polymer with constituents including copolymer of (meth)acrylate and (meth)acrylic acid at a rate of not less than 70% by mass is preferable since such polymer is further excellent in fixability and glossness of the ink. Polymer obtained by polymerizing a monomer constituent including at least one of alkyl(meth)acrylate with one to twenty four carbons and cyclic alkyl(meth)acrylate with three to twenty four carbons at a rate of not less than 70% by mass is preferable. Although the monomer constituent is not limited to the following examples, the specific examples thereof include methyl(meth)acrylate, ethyl(meth)acrylate, propyl(meth)acrylate, n-buthyl(meth)acrylate, isobutyl(meth)acrylate, pentyl(meth)acrylate, hexyl(meth)acrylate, 2-ethylhexyl(meth)acrylate, octyl(meth)acrylate, nonyl(meth)acrylate, decyl(meth)acrylate, t-buthylcyclohexyl(meth)acrylate, lauryl(meth)acrylate, isobornyl(meth)acrylate, cetyl(meth)acrylate, stearyl(meth)acrylate, isostearyl(meth)acrylate, tetramethylpiperidyl(meth)acrylate, dicyclopentanyl(meth)acrylate, dicyclopentenyl(meth)acrylate, dicyclopentenyloxy(meth)acrylate, and behenyl(meth)acrylate. In addition, it is also possible to use hydroxyl(meth)acrylate which includes a hydroxyl group such as hydroxyethyl(meth)acrylate, hydroxypropyl(meth)acrylate, and diethylene glycol(meth)acrylate, urethane(meth)acrylate, and epoxy(meth)acrylate as other monomer constituents for polymerization.

2-3. Pigment Coated with Polymer

In addition, pigment which is coated with polymer, namely micro-capsuled pigment is preferably used among the examples of the polymer dispersion type pigment since such pigment is excellent in fixability, glossness, and color reproducibility of the ink.

The pigment coated with polymer is obtained by a phase-transfer emulsification method. That is, the polymer is dissolved in organic solvent such as methanol, ethanol, isopropanol, n-butanol, acetone, methyl ethyl ketone, and dibutyl ether. The pigment is added to the obtained solution, neutralizer and water are then added thereto, and kneading and dispersion treatment is performed thereon to prepare oil-in-water type dispersion. Then, the pigment coated with polymer can be obtained as water dispersion by removing the organic solvent from the obtained dispersion. The kneading and dispersion treatment can be performed by using ball mill, roll mill, bead mill, a high-pressure homogenizer, and a high-speed stirring type disperser.

Preferable examples of the neutralizer include tertiary amine such as ethyl amine and trimethylamine, lithium hydroxide, sodium hydroxide, potassium hydroxide, and ammonium. It is preferable that pH of the obtained water dispersion is from six to ten.

The weight-average molecular weight based on GPC of the polymer coating the pigment is preferably about 10000 to 150000 in terms of stable dispersion of the pigment.

Color pigment which is coated with polymer is preferable among various kinds of pigment coated with polymer. By using such color pigment, it is possible to achieve an excellent chromogenic property of the printed textile.

3. Resin Emulsion

It is preferable that the ink composition according to this embodiment further include resin emulsion. Since the resin emulsion fixes the pigment to the recording medium by fusing resin and fusing resin and pigment, respectively, as the ink dries, it is possible to obtain further satisfactory abrasion resistance and washing fastness of the image part on the recorded object. Urethane resin emulsion is preferable among various kinds of resin emulsion. In doing so, it is possible to obtain excellent fixability of the ink and to thereby obtain both excellent abrasion resistance and excellent washing fastness of the printed textile.

When the resin emulsion is included in the ink composition, it is possible to obtain excellent abrasion resistance of the printed textile by the resin emulsion forming a resin coating film on the fabric and sufficiently fixing the ink composition to the fabric. For this reason, the resin emulsion is preferably thermoplastic resin. Particularly, a desired film physical property can be easily obtained by urethane resin emulsion since the urethane resin emulsion has a high degree of freedom in design.

The urethane resin emulsion is resin emulsion which include urethane bonding in a molecule. Furthermore, it is also possible to use polyether type urethane resin which includes ether bonding in a main chain, polyester type urethane resin which includes ester bonding in a main chain, and polycarbonate type urethane resin which includes carbonate bonding in a main chain as well as the above urethane bonding.

Hereinafter, a description will be given of a preferably physical property of the resin emulsion. First, since it is preferable that the resin emulsion have a film forming property in a temperature range (from 15° C. to 35° C.) in which ink jet recording is generally performed, Tg is preferably not more than −10° C., and more preferably not more than −15° C. If Tg of the resin emulsion is within the above range, fixability of the ink adhered to the printed textile becomes further excellent, and a result, abrasion resistance of the printed textile becomes further excellent. Although the lower limit of Tg is not particularly limited, Tg is preferably not less than −50° C.

In addition, the acid number of the resin emulsion is preferably from 10 mgKOH/g to 100 mgKOH/g, and more preferably from 15 mgKOH/g to 50 mgKOH/g. If the acid number is not more than 100 mgKOH/g, it is possible to satisfactorily maintain the washing fastness of the printed textile. In addition, if the acid number is not less than 10 mgKOH/g, it is possible to obtain excellent ink reserving stability and obtain an excellent chromogenic property and fixability of the ink on the fabric.

In addition, the acid number in this specification is measured by using AT610 manufactured by Kyoto Electronics Manufacturing Co., Ltd., and a value calculated by applying numerical values to the following equation is applied.

Acid number (mg/g)=$(EP1-BL1) \times FA1 \times C1 \times K1$/SIZE

In the equation, $EP1$ represents a quantity of titrant (mL), $BL1$ represents a blank value (0.0 mL), $FA1$ represents a factor of the quantity of titrant (1.00), $C1$ represents a density conversion value (5.611 mg/mL) (an amount equivalent to 0.1 mol/L KOH 1 mL), $K1$ represents a coefficient (1), and SIZE represents a sample collection amount (g).

The resin emulsion preferably has fracture elongation from 200% to 500% and a degree of elasticity from 20 MPa to 400 MPa since it is possible to prevent fracture and crack of the image, namely the ink layer on the fabric which easily extends among recording mediums and obtain excellent washing fastness and abrasion resistance and the printed textile.

Here, the fracture elongation in this specification can be measured under conditions that a tensile test gauge length is 20 mm and a rate of pulling is 100 mm/minute by creating a film with a thickness of about 60 μm. In relation to the degree of elasticity in the specification, tensile modulus can be measured by creating a film with a thickness of about 60 μm, forming the film into a tensile test dumbbell with a width of 10 mm at a parallel part an a length of 40 mm, and performing a tensile test thereon based on JIS K7161:1994.

Specific description will be given of JIS K7161:1994. A corresponding international standard is ISO 527-1:1993, the title of which is a test method of plastic-tensile property. In addition, summary of the standard is for prescribing general principles for measuring tensile properties of plastic and a plastic composite material under predetermined conditions.

D50 of the resin emulsion is preferably from 30 nm to 300 nm, and more preferably from 80 nm to 300 nm. If D50 is within the above range, it is possible to uniformly disperse the resin emulsion particles in the ink composition. In addition, it is further preferable that the lower limit of D50 be 100 nm since it is possible to obtain further excellent abrasion resistance of the printed textile.

From the viewpoint of physical property of the resin emulsion described above, preferable examples of commercially available urethane resin emulsion include Suncure 2710 (a name of a product manufactured by The Lubrizol Corporation), Permarin UA-150 (a name of a product manufactured by Sanyo Chemical Industries, Ltd.), Superflex 460, 470, 610, and 700 (all of which are names of products manufactured by Dai-ichi Kogyo Seiyaku Co., Ltd.), NeoRez R-9660, R-9637, and R-940 (all of which are names of products manufactured by Kusumoto Chemicals, Ltd.), Adeka Bontighter HUX-380, and 290K (all of which are names of products manufactured by Adeka Corporation), Takerac (registered trademark) W-605, W-635, and WS-6021 (all of which are names of products manufactured by Mitsui Chemicals, Inc.), and Polyether (a name of a product manufactured by Taisei Finechemicals Co., Ltd., Tg=20° C.) though not limited thereto.

One kind or two or more kinds of urethane resin emulsion may be used alone or in combination.

In addition, the ink composition according to the embodiment may include resin emulsion other than the urethane resin emulsion. Among various kinds of such resin emulsion, anionic resin emulsion is preferable since it is possible to effectively prevent the resin from condensing. Although the anionic resin emulsion is not limited to the following examples, the examples thereof include homopolymer or copolymer of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinylpyrrolidone, vinylpyridine, vinylcarbazole, vinylimidazole, and vinylidene chloride, fluorine resin, and natural resin. Among the examples, at least one of (meth)acrylic resin and styrene-(meth)acrylic acid copolymer resin is preferable, at least one of acrylic resin and styrene-acrylic acid copolymer resin is more preferable, and styrene-acrylic acid copolymer resin is further more preferable. In addition, the copolymer may be in any form among random copolymer, block copolymer, alternate copolymer, and graft copolymer.

As the resin emulsion other than the urethane resin emulsion, resin emulsion which is obtained from known materials by a known manufacturing method may be used, or commercially available resin emulsion may be used. Although commercially available products are not limited to the following examples, the examples thereof include Movinyl 966A (a name of a product manufactured by Nippon Synthetic Chemical Industry Co., Ltd., acrylic resin emulsion), Microjel E-1002 and Microjel E-5002 (all of which are names of products manufactured by Nippon Paint Co., Ltd.), Boncoat 4001 and Boncoat 5454 (all of which are names of products manufactured by DIC Corporation), SAE 1014 (a name of a product manufactured by Zeon Corporation), Sivinol SK-200 (a name of a product manufactured by Saiden Chemical Industry Co., Ltd.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (all of which are names of products manufactured by BASF Japan Ltd.), and NK binder R-5HN (a name of a product manufactured by Shin-Nakamura Chemical Co., Ltd., acrylic resin emulsion, solid content: 44%). Among the examples, Movinyl 966A which is acrylic resin emulsion is preferable since Movinyl 966A sufficiently satisfies the aforementioned preferable physical property for resin emulsion.

One kind or two or more kinds of resin emulsion other than the urethane resin emulsion may be used alone or in combination.

Here, a description will be given of the content of the resin emulsion. First, the content as solid content of the urethane resin emulsion among other kinds of resin emulsion is within a range from 3.5% by mass to 14% by mass with respect to the total mass (100% by mass) of the ink composition in the same manner as the aforementioned content of the urethane resin. If the content of the urethane resin is within the above range, quite a large amount of the urethane resin in included in the ink composition. Therefore, the ink reserving stability at a high temperature deteriorates, and foreign matters caused by the urethane resin are easily generated. However, if the content of the urethane resin falls below the range, washing fastness and abrasion resistance of the printed textile deteriorate. Thus, the present inventors discovered an ink composition which had high urethane resin content and included a lactic acid ester compound. Since the lactic acid ester compound in the ink composition makes it possible to obtain satisfactory ink preserving stability at a high temperature, it is possible to prevent foreign matters from being generated even if the content of the urethane resin is within the above range. In addition, the high urethane resin content in the ink composition makes it possible to obtain excellent washing fastness and abrasion resistance of the printed textile. More specifically, if the content is not less than 3.5% by mass, it is possible to obtain excellent washing fastness and abrasion resistance of the printed textile. On the other hand, if the content is not more than 14% by mass, it is possible to obtain excellent stability of the ink composition over a long time and reduce the viscosity of the ink composition, in particular.

In addition, the content is preferably from 7% by mass to 14% by mass, and more preferably from 8% by mass to 13% by mass since it is possible to obtain more excellent washing fastness and abrasion resistance of the printed textile. Furthermore, the total content as solid content of the resin emulsion including the urethane resin emulsion is preferably from 5% by mass to 15% by mass with respect to the total mass (100% by mass) of the ink composition. If the total content is within the above range, it is possible to reduce the solid content density of the resin (polymer) in the ink composition and to thereby obtain more satisfactory ejection stability.

4. Cyclic Amide Compound

It is preferable that the ink composition according to the embodiment further include a cyclic amide compound. The cyclic amide compound has a function of enhancing solubility of the lactic acid ester compound in water. Thus, it is possible to further increase dissolving power of the urethane resin (emulsion) and further effectively prevent precipitation of foreign matter s as described above by including the cyclic amide compound with the lactic acid ester compound in the ink composition, and therefore, it is possible to obtain further excellent reserving stability, particularly, reserving stability at a high temperature.

In addition, since the cyclic amide compound also has a moisturizing performance, it is possible to prevent condensing and solidifying of the ink due to evaporation of moisture of the urethane resin (emulsion), other resin (polymer), the pigment, and the like during the ink preservation. In doing so, it is possible to prevent clogging in the vicinity of a nozzle of a head during the ink jet textile printing and obtain satisfactory ejection stability of the ink composition.

Although the cyclic amide compound is not limited to the following examples, the specific examples thereof include 2-pyrrolidone, N-methyl-2-pyrrolidone, and N-ethyl-2-pyrrolidone. Among the examples, 2-pyrrolidone is preferable since the dissolving power in the resin (polymer) is further increased, and further more preferable reserving stability, particularly reserving stability at a high temperature can be obtained.

One kind or two or kind of the cyclic amide compounds may be used alone or in combination.

The content of the cyclic amide compound is preferably from 0.5% by mass to 5% by mass, and more preferably from 1% by mass to 3% by mass with respect to the total mass (100% by mass) of the ink composition. If the content is within the above range, it is possible to obtain more excellent reserving stability over a long time and ejection stability of the ink, and more excellent abrasion resistance and washing fastness of the printed textile resulted from excellent fixability of the ink.

5. Water

The ink composition according to the embodiment preferably includes water as water-based solvent. Examples of the water-based solvent include water and water-soluble organic solvent. Water is not particularly limited, and it is possible to use pure water or ultrapure water such as ion-exchanged water, ultrafiltrated water, reverse osmosis water, and distilled water. The content of water is not particularly limited and may be appropriately set as necessary. However, water is preferably included at a rate from 20% by mass to 80% by mass with respect to the total mass (100% by mass) of the ink composition in order to adjust the viscosity of the ink composition within a preferable range.

In addition, various additives (constituents) descried below do not include the aforementioned cyclic amide compound in order to avoid repetition.

6. Penetrant

It is preferable that the ink composition according to the embodiment further contain penetrant in order to further promote permeation of the water-based solvent, which is a constituent of the ink composition, to the fabric. If the water-based solvent is rapidly permeated to the fabric, it is possible to obtain a printed textile with less image bleeding.

Preferable examples of such penetrant include alkyl ether (glycol ethers) of polyvalent alcohol and 1,2-alkyldiol. Although glycol ethers are not limited to the following examples, the examples thereof include ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobuthyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobuthyl ether, dipropylene glycol monomethyl ether, dipropylene glycol monoethyl ether, dipropylene glycol monopropyl ether, propylene glycol monobuthyl ether, and dipropylene glycol monobuthyl ether. Although 1,2-alkyldiol is not limited to the following examples, the examples thereof include 1,2-pentanediol and 1,2-hexanediol. Other examples include diols of linear carbon hydride such as 1,3-propanediol, 1,4-butanediol, 1,5-pentanediol, 1,6-hexanediol, 1,7-heptanediol, and 1,8-octanediol.

One kind or two or more kinds of the penetrant may be used alone or in combination.

The content of the penetrant is preferably from 0.1% by mass to 20% by mass, and more preferably from 0.5% by mass to 10% by mass with respect to the total mass (100% by mass) of the ink composition. If the content is not less than 0.1% by mass, it is possible to increase a degree of permeation of the ink composition to the fabric. On the other hand, if the content is not more than 20% by mass, it is possible to prevent occurrence of image bleeding and prevent the viscosity of the ink composition from being increased.

7. Moisturizer

The ink composition according to the embodiment may further include moisturizer (wetting agent). Any moisturizer is available without any particular limitation as long as the moisturizer is generally used in ink jet ink. It is preferable to use moisturizer with a high boiling point of not less than 180° C., and it is more preferable to use moisturizer with a high boiling point of not less than 200° C. If the boiling point is within the above range, it is possible to provide satisfactory water retentivity and humidity to the ink composition.

Although the moisturizer with a high boiling point is not limited to the following examples, the specific examples thereof include ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol with a number-average molecular weight of not more than 2000, 1,3-propylene glycol, isopropylene glycol, isobutylene glycol, glycerin, mesoerythritol, and pentaerythritol.

One kind or two or more kinds of the moisturizer may be used alone or in combination. It is possible to obtain an ink composition capable of maintaining fluidity and a property that the ink composition can be dispersed again for a long time by including the moisturizer with a high boiling point in the ink composition even if the ink composition is left in an opened state, namely a state where the pigment ink is in contact with the air at a temperature corresponding to an environment temperature at which the aforementioned preprocessing liquid is applied. Furthermore, according to such an ink composition, nozzle clogging hardly occurs in the course of the textile printing using an ink jet textile printing apparatus or during reactivation after pause. Therefore, it is possible to obtain excellent ejection stability of the ink composition. The content of the moisturizer is not particularly limited and may be appropriately set as necessary.

When the ink composition includes the cyclic amide compound as described above, the cyclic amide compound may be used as moisturizer since the cyclic amide compound has a moisturizing performance.

8. Surfactant

The ink composition according to the embodiment may include surfactant. As the surfactant, at least any of acetylenic glycol system surfactant, acetylenic alcohol system surfactant, and polysiloxane system surfactant is preferable. If the ink composition includes such surfactant, it is possible to obtain a further satisfactory drying property of the ink composition adhered on the fabric and implement high-speed printing.

Among the examples, polysiloxane system surfactant is more preferable since a degree of dissolving in the ink increases and foreign matters further hardly occurs.

The acetylenic glycol system surfactant and the acetylenic alcohol system surfactant are not limited to the following examples, one or more kinds selected from alkylene oxide adduct of 2,4,7,9-tetramethyl-5-desine-4,7-diol and 2,4,7,9-tetramethyl-5-desine-4,7-diol and alkkylene oxide adduct of 2,4-dimethyl-5-desine-4-ol and 2,4-dimethyl-5-desine-4-ol. As these surfactant, commercially available products such as Olfine 104 series and E series such as Olfine E1010 (names of products manufactured by Air Products Japan, Ltd.) and Surfynol 465 and Surfynol 61 (names of products manufactured by Nissin Chemical Industry Co., Ltd.) are available.

Examples of the polysiloxane system surfactant include BYK-347 and BYK-348 (names of products manufactured by BYK Additives and Instruments Japan).

In addition, the surfactant is preferably included at a rate from 0.1% by mass to 3% by mass with respect to the total mas (100% by mass) of the ink composition.

9. Other Constituents

Various additives such as moisturizer, dissolving aid, permeation inhibitor, viscosity adjuster, pH adjuster, dissolving aid, antioxidant, antiseptic agent, fungicide, corrosion inhibitor, and chelator to capture metal ions which effect dispersion can be appropriately added to the ink composition according to the embodiment in order to maintain satisfactory reserving stability and ejection stability from the head, solve clogging, or prevent the ink from deteriorating.

Ink Jet Textile Printing Method

According to an embodiment of the invention relates to an ink jet textile printing method. The ink jet textile printing method includes forming an image on a fabric through the ink jet textile printing using the ink set for ink jet textile printing according to the embodiment.

More specifically, the ink jet textile printing method includes a preprocessing process in which the preprocessing liquid for textile printing according to the embodiment is applied to a fabric, a drying processing in which the fabric after the preprocessing process is heated at a temperature of not less than 100° C. to dry the applied preprocessing liquid for textile printing, and an ink adhesion process in which the ink for ink jet textile printing is adhered to the fabric after the drying process.

Although the fabric used in the ink jet textile printing method is not limited to the following examples, the examples thereof include natural fiber such as silk, cotton, wool, nylon, polyester, and rayon or synthetic fiber. Among the examples, cotton is preferable since cotton has a resistance against fixation of the ink composition at a high temperature.

In the ink jet textile printing, the ink printing apparatus is filled with the ink composition and used. Although the ink jet textile printing apparatus is not particularly limited, examples thereof include drop on-demand type ink jet textile printing apparatus. Examples of the drop on-demand type ink jet textile printing apparatus include an apparatus which employs an ink jet textile printing method using a piezoelectric element disposed in a head and an apparatus which employs an ink jet textile printing method using thermal energy by a heater of a heat generating resistance element disposed in a head. An apparatus employing any of the ink jet textile printing methods may be used.

Hereinafter, a detailed description will be given of the respective processes included in the ink jet textile printing method.

1. Preprocessing Process

In the preprocessing process, the preprocessing liquid for textile printing according to the above embodiment is applied to a fabric.

Although a method for the preprocessing is not limited to the following examples, the examples thereof include a mechanism for dipping the fabric in the preprocessing liquid for textile printing and a mechanism for applying or spring the preprocessing liquid for textile printing to the fabric. Among the examples, a mechanism for applying the preprocessing liquid for textile printing to the fabric by using a roller is preferable since the mechanism is excellent in preventing the preprocessing liquid from flying apart to the circumference and it is possible to obtain a satisfactory operation environment.

Since the detailed description has already been given of the preprocessing in the section for describing the preprocessing liquid for textile printing, a description thereof is omitted here.

2. Drying Process

The drying processing is for heating the fabric after the preprocessing process and drying the coated preprocessing liquid for textile printing. More specifically, the preprocessing liquid for textile printing is made to adhere to the fabric, the fabric is then dried, and the adhering preprocessing liquid for textile printing is dried.

The heating temperature is not less than 100° C., preferably from 110° C. to 200° C., and more preferably from 120° C. to 180° C. among heating conditions after causing the preprocessing liquid for textile printing to adhere to the fabric. In addition, the heating time is preferably set to be not more than 2 minutes. If the heating temperature is not less than 100° C., it is possible to obtain satisfactory fixability of the preprocessing liquid for textile printing. In addition, if the heating temperature is not more than 200° C., it is possible to effectively prevent deterioration of the fabric and deterioration of the constituents in the preprocessing liquid for textile printing such as polymer. Although the drying mechanism is not limited to the following examples, the examples thereof include drying by a hot press machine, an oven, and the like.

3. Ink Adhesion Process

The ink adhesion process is for causing the ink for ink jet textile printing to adhere to the fabric after the drying process. More specifically, the ink for ink jet textile printing is ejected toward a surface (image formation region) of the fabric, on which the adhering preprocessing liquid for textile printing has been dried, and caused to adhere on the surface, and an image is formed thereon.

In addition, an ejection condition may be appropriately set based on the physical property of the ejected ink.

4. Heating Process

The ink jet textile printing method may further include a heating process. In the heating process, heating treatment is performed on the fabric to which the ink for ink jet textile printing adheres. By the heating treatment, it is possible to fuse the resin (polymer) which can be included in the ink to the surface of the fabric and evaporate moisture. As a result, it is possible to obtain more excellent abrasion resistance of the printed textile.

Although the heating treatment is not limited to the following examples, the examples thereof include a heat press method, an atmospheric pressure steam method, a high pressure steam method, and a thermofix method. In addition, although a heat source for heating is not limited to the following examples, the examples thereof include an infrared ray (lamp). In addition, the temperature during the heating treatment may be appropriately set as long as it is possible to fuse the resin (polymer) which can be included in the ink and evaporate the moisture, and is preferably from 150° C. to 200° C.

After the heating process, the printed textile may be washed with water and dried. At this time, a soaping treatment, namely a treatment for rinsing unfixed pigment with heated saponated solution may be performed as necessary.

As described above, it is possible to obtain a recorded object such as a printed textile on which an image created by the ink according to the embodiment is formed on a recording medium such as a fabric. The recorded object is excellent in a chromogenic property since it is possible to prevent occurrence of crack, unevenness, contamination, and the like. In addition, the recorded object is excellent in abrasion resistance since the ink fixability (adhesiveness) is satisfactory.

EXAMPLES

Hereinafter, a further detailed description will be given of the embodiments of the invention based on the examples. However, the embodiments are not limited only to the examples.

1. Production of Non-Ionic Resin Emulsion A to D

First, the following non-ionic resin emulsion A to D was produced.

1-1. Production Example of Non-Ionic Resin Emulsion A which Includes Color Forming Substance and Color Developer 50 ml of ion-exchanged water, and 2 g of 2,2'-azobis[2-methyl-N-(2-hydroxyethyl)propion amide](VA-086 [product name] manufactured by Wako Pure Chemical Industries, Ltd.) were poured to a reaction container provided with a stirrer, a reflux condenser, a dripping funnel, a thermometer, and a nitrogen introduction pipe, the mixture was stirred in a nitrogen atmosphere, and the temperature thereof was raised to 85° C. Then, 100 g of styrene, 50 g of n-buthylmethacrylate, 5 g of 2-hydroxyethylmethacrylate, 2.0 g of non-ionic surfactant (Adekalia Soap ER10 [product name] manufactured by Adeka Corporation), and 150 ml of ion-exchanged water were stirred, and mixture was prepared. The mixture was gradually dripped over five hours by using the dripping funnel, and the mixture was further polymerized for five hours. The obtained emulsion was cooled and filtered by a filter of 0.5 μm, the resulting object was adjusted with ion-exchanged water such that the concentration of the generated high-molecular particles was 30%, and non-ionic resin emulsion was obtained. A glass-transition point measured by a differential scanning calorimeter (DSC) was 58° C.

1-2. Production Example of Non-Ionic Resin Emulsion B which Includes Color Forming Substance and Color Developer 20 g of leuco dye (PSD-V [product name], manufactured by Nippon Soda Co., Ltd., red leucodye) and 17 g of methylidenetris-p-cresol (color developer) (a molar ratio of leuco dye:color developer=1:1) were melted, mixed, and then gradually cooled, and a red solid substance was obtained. This was pulverized by a mill. 5 g of the pulverized substance was dissolved in monomer liquid, in which 100 g of styrene, 50 g of n-buthylmethacrylate, and 5 g of 2-hydroxyethylmethacrylate were mixed, 2.0 g of non-ionic surfactant (Adekalia Soap ER10 [product name], manufactured by Adeka Corporation) and 150 ml of ion-exchanged water were further stirred, and mixture was prepared.

50 ml of ion-exchanged water and 2 g of 2,2'-azobis[2-methyl-N-(2-hydroxyethyl)propion amide] (VA-086 [product name], manufactured by Wako Pure Chemical Industries, Ltd.) were poured to a reaction container provided with a stirrer, a reflux condenser, a dripping funnel, a thermometer, and a nitrogen introduction pipe, the mixture was stirred in a nitrogen atmosphere, and the temperature thereof was raised to 85° C. Then, the above mixture prepared in advance was gradually dripped over five hours by using the dripping funnel, and the mixture was further polymerized for five hours. The obtained red emulsion was cooled and filtered by a filter of 0.5 μm, and the resulting object was adjusted with ion-exchanged water such that the concentration of the non-ionic high-molecular particles including the generated color forming substance and the color developer was 30%, and non-ionic resin emulsion including the color forming substance and the color developer was obtained. A glass-transition point measured by a differential scanning calorimeter (DSC) was 58° C.

1-3. Production Example of Non-ionic Resin Emulsion C which Includes Decolorant 15 g of methyl cholate was dissolved in monomer liquid in which 100 g of styrene, 50 g of n-buthylmethacrylate, and 5 g of 2-hydroxyethylmethacrylate were mixed, 2.0 g of non-ionic surfactant (Adekalia Soap ER10 [product name], manufactured by Adeka Corporation) and 150 ml of ion-exchanged water were further stirred, and mixture was prepared.

50 ml of ion-exchanged water and 2 g of 2,2'-azobis[2-methyl-N-(2-hydroxyethyl)propion amide] (VA-086 [product name], manufactured by Wako Pure Chemical Industries, Ltd.) were poured to a reaction container provided with a stirrer, a reflux condenser, a dripping funnel, a thermometer, and a nitrogen introduction pipe, the mixture was stirred in a nitrogen atmosphere, and the temperature thereof was raised to 85° C. Then, the above mixture prepared in advance was gradually dripped over five hours by using the dripping funnel, and the mixture was further polymerized for five hours. The obtained red emulsion was cooled and filtered by a filter of 0.5 μm, and the resulting object was adjusted with ion-exchanged water such that the concentration of the non-ionic high-molecular particles including the generated color forming substance and the color developer was 30%, and non-ionic resin emulsion including the color forming substance and the color developer was obtained. A glass-transition point measured by a differential scanning calorimeter (DSC) was 58° C.

1-4. Production Example of Non-ionic Resin Emulsion D which Includes Color Forming Substance, Color Developer, and Decolorant 10 g of leuco dye (PSD-184 [product name], manufactured by Nippon Soda Co., Ltd., red leucodye), 10 g of 2,3,4-trihydroxybenzophenone (color developer), and 100 g of methyl cholate were melted, mixed, and then gradually cooled, and a red solid substance was obtained. This was pulverized by a mill. 10 g of the pulverized substance was dissolved in monomer liquid, in which 100 g of styrene, 50 g of n-buthylmethacrylate, and 5 g of 2-hydroxyethylmethacrylate were mixed, 2.0 g of non-ionic surfactant (Adekalia Soap ER10 [product name], manufactured by Adeka Corporation) and 150 ml of ion-exchanged water were further stirred, and mixture was prepared.

50 ml of ion-exchanged water and 2 g of 2,2'-azobis[2-methyl-N-(2-hydroxyethyl)propion amide] (VA-086 [product name], manufactured by Wako Pure Chemical Industries, Ltd.) were poured to a reaction container provided with a stirrer, a reflux condenser, a dripping funnel, a thermometer, and a nitrogen introduction pipe, the mixture was stirred in a nitrogen atmosphere, and the temperature thereof was raised to 85° C. Then, the above mixture prepared in advance was gradually dripped over five hours by using the dripping funnel, and the mixture was further polymerized for five hours. The obtained red emulsion was cooled and filtered by a filter of 0.5 μm, and the resulting object was adjusted with ion-exchanged water such that the concentration of the non-ionic high-molecular particles including the generated color forming substance and the color developer was 30%, and non-ionic resin emulsion including the color forming substance and the color developer was obtained. A glass-transition point measured by a differential scanning calorimeter (DSC) was 58° C.

2. Production of Heat Discoloration Type Coloring Material

The respective heat discoloration type coloring materials were produced by using the non-ionic resin emulsion A to D produced as described above.

0.4 g of RED 40 (a name of a product manufactured by Yamamoto Chemicals Inc., red leuco dye), 2 g of Phosphanol RM710 (a name of a product manufactured by Toho Chemical Industry Co., Ltd., mixture of phosphate group monoalkyl ester and phosphate group dialkyl ester, color developer), and 15 g of glycerin were added to 100 g of the obtained non-ionic resin emulsion, the mixture was heated and stirred, and dye solution which was made to produce a color was stirred, dripped thereto and then heated at 50° C. for dying for one hour. The non-ionic high-molecule particles including the color forming substance and the color developer were measured by a particle size analyzer (Microtrac UPA manufactured by Leeds and Northrup Company) based on a light scattering method, and an average particle size was 100 nm.

3. Preparation of Preprocessing Liquid for Textile Printing

Materials shown in Table 1 below were mixed at the content (in units of % by mass) shown in Table 1, and the mixture was sufficiently stirred (the total amount was regarded as 100% by mass). In doing so, preprocessing liquid for textile printing P1 to P5 was prepared.

In addition, "resin A" in Table 1 is non-ionic styrene-acrylic resin emulsion (Movinyl 966A manufactured by Nichigo-Movinyl Co., Ltd., solid content: 45% by mass). "BYK-348" is polysiloxane system surfactant manufactured by BYK Additives and Instruments. "Decolorant (polyvinylpyrrolidon K-30)" is polyvinylpyrrolidone manufactured by Nippon Shokubai Co., Ltd. (solid content: not less than 95.0%, pH=3.0 to 7.0).

TABLE 1

| No. of preprocessing liquid for textile printing | P1 | P2 | P3 | P4 | P5 |
|---|---|---|---|---|---|
| calcium nitrate tetrahydrate (Ca concentration: 17.0%) | 20 | 20 | 20 | 20 | 20 |
| Resin A (solid content: 45%) | 10 | 10 | 10 | 10 | 10 |
| Non-ionic resin emulsion A including color forming substance and color developer | 5 | 5 | — | — | — |
| Non-ionic resin emulsion B including color forming substance and color developer | — | — | 5 | — | — |
| Decolorant (polyvinylpyrrolidon K-30) | 5 | — | 5 | — | — |
| Non-ionic resin emulsion C including decolorant | — | 5 | — | — | — |
| Non-ionic resin emulsion D including color forming substance, color developer, and decolorant | — | — | — | 10 | — |
| BYK-348 | 0.1 | 0.1 | 0.1 | 0.1 | 0.1 |
| Ion-exchanged water | Remaining amount | Remaining amount | Remaining amount | Remaining amount | Remaining amount |
| Concentration of calcium ion (Ca) (% by mass) | 3.4 | 3.4 | 3.4 | 3.4 | 3.4 |
| Concentration of solid content of resin (% by mass) | 4.5 | 4.5 | 4.5 | 4.5 | 4.5 |

Here, the preprocessing liquid for textile printing P1 to P4 can be used for examples described later, and the preprocessing liquid for textile printing P5 can be used only for a comparative example in Table 1.

4. Materials Used for Preparing White Ink

Main materials used in the following examples and comparative examples are as follows.

4-1. White Pigment

Titanium oxide slurry (NanoTek® Slurry manufactured by C.I. Kasei Co., Ltd., solid content of titanium oxide: concentration of 15%, average particle size: 250 nm) was used.

4-2. Urethane Resin Emulsion

Suncure 2710 (a name of a product manufactured by The Lubrizol Corporation, anionic, solid content: 40%, hereinafter, referred to as "urethane resin A"), and Permarin UA-150 (a name of a product manufactured by Sanyo Chemical Industries, Ltd., anionic, solid content: 30%, hereinafter, referred to as "urethane resin B") were used.

4-3. Cyclic Amide Compound 2-pyrrolidone (manufactured by Kanto Chemical Co., Inc.) was used.

4-4. Moisturizer

Glycerin (manufactured by Sakamoto Yakuhin Kogyo Co., Ltd.) and triethylene glycol (manufactured by Kanto Chemical Co., Inc.) were used.

4-5. Glycol Ether

Triethylene glycol monobutyl ether (manufactured by Kanto Chemical Co., Inc.) was used.

4-6. Surfactant

BYK-348 (a name of a product manufactured by BYK Additive and Instruments, as described above) was used.

5. Preparation of White Ink

Materials in Table 2 shown below were mixed at the content (in units of % by mass) shown in Table 2, and the mixture was sufficiently stirred (the total amount was regarded as 100% by mass). In doing so, preprocessing liquid for textile printing P1 to p5 was prepared. The stirred liquid was filtered by a metal filter with a pore diameter of 5 µm and subjected to deaeration treatment by using a vacuum pump, and white ink W1 and W2 was obtained.

In Table 2 shown below, "titanium oxide concentration" means "solid content concentration of titanium oxide (%)", and "urethane resin concentration" means "solid content concentration of urethane resin (%)".

TABLE 2

| White Ink No. | W1 | W2 |
|---|---|---|
| Titanium oxide slurry (solid content: 15%) | 50 | 50 |
| Urethane resin A (solid content: 40%) | 22 | — |
| Urethane resin B (solid content: 30%) | — | 28 |
| 2-pyrrolidone | 1 | 1 |
| Glycerin | 8 | 8 |
| Triethylene glycol | 1 | 1 |
| Triethylene glycol monobutyl ether | 1 | 1 |
| BYK-348 | 0.3 | 0.3 |
| Ion-exchanged water | Remaining amount | Remaining amount |
| Solid content concentration of titanium oxide (% by mass) | 7.5 | 7.5 |
| Solid content concentration of urethane resin (% by mass) | 8.8 | 8.4 |

6. Manufacturing of Printed Textile

Examples 1 to 6 and Comparative Examples 1 and 2

6-1. Preprocessing Process

A 100% cotton T-shirt (Heavyweight manufactured by Hanesbrands Japan Inc., blue cloth) was prepared as a fabric, and the preprocessing liquid for textile printing prepared as described above and shown in Table 3 below was applied to the T-shirt by using a commercially available roller such that 18 g to 20 g of the preprocessing liquid was applied per A4 size.

Evaluation was made regarding whether or not the application of the preprocessing liquid by the roller can be uniformly made at this time. A specific evaluation method will be described later in a section of "Easiness of Preprocessing Liquid Application (uniformity)".

After the application, the T-shirt was subjected to heating treatment at 160° C. for one minute by using a heat press machine.

At this time, evaluation was made regarding whether coloring caused by the preprocessing liquid for textile printing remained on the T-shirt cloth after the heat press (after the heat treatment). A specific evaluation method will be described later in a section of "Coloring after Heat Press after Preprocessing".

6-2. Adhesion Process of White Ink

The white ink prepared as described above and shown in Table 3 below was caused to adhere to the fabric after the preprocessing process based on the ink jet method using an ink jet printer (PX-G930 manufactured by Seiko Epson Corporation). As a recording condition, recording resolution was set to 1440 dpi×1440 dpi, a recording range was set to the A4 size, and four layers of a solid pattern image were applied in an overlapped manner. The ink jet textile printing was performed as described above.

6-3. Heating Process

The fabric to which the respective white ink has adhered was subjected to heating treatment at 160° C. for one minute by using a heat press machine, and the white ink was fixed to the fabric. The printed textile with an image formed thereon (with the ink printed thereon) was manufactured as described above.

At this time, color irregularity of the obtained printed textile was evaluated. A specific evaluation method will be described later in a section of "Color Irregularity after White Ink Textile Printing" below.

7. Evaluation Items of Fabric and Printed Textile after Applying and Drying Preprocessing Liquid for Textile Printing 7-1. Easiness of Preprocessing Liquid Application (Uniformity)

The following determination was made from a viewpoint of how easy to recognize application trace of the preprocessing liquid for textile printing. Evaluation criteria are as follows. Evaluation results will be shown in Table 3 below.

O: The trace of the application in the preprocessing was colored. It was possible to estimate an application amount based on the coloring amount and easily apply the preprocessing liquid.

X: The trace of the application in the preprocessing was not colored. It was not possible to estimate an approximate application amount and easily apply the preprocessing liquid though the fabric was wet.

7-2. Coloring after Heat Press after Preprocessing

The following determination was made based on whether or not the coloring caused by the preprocessing liquid for textile printing remained on the T-shirt cloth after the application of the preprocessing liquid for textile printing and after the heat press (after the heat treatment). Evaluation criteria are as follows. Evaluation results will be shown in Table 3 below.

O: Coloring caused by the preprocessing liquid was not observed.

X: coloring caused by the preprocessing liquid remained.

7-3. Color Irregularity after White Ink Textile Printing

The coloring irregularity in the white printed part on the T-shirt after printing the white ink was visually determined. Evaluation criteria are as follows. Evaluation results will be shown in Table 3 below.

O: Color irregularity was unnoticeable or substantially unnoticeable.

X: Color irregularity was noticeable (many light white parts were observed).

TABLE 3

[Examples 1 to 6, Comparative Examples 1 and 2]

| Evaluation Items/Example No. | Examples | | | | | | Comparative Examples | |
| --- | --- | --- | --- | --- | --- | --- | --- | --- |
| | 1 | 2 | 3 | 4 | 5 | 6 | 1 | 2 |
| Preprocessing liquid for textile printing No. | P1 | P2 | P3 | P4 | P1 | P1 | P5 | P5 |
| White ink No. | W1 | W1 | W1 | W1 | W1 | W2 | W1 | W2 |
| Easiness of preprocessing liquid application (uniformity) | O | O | O | O | O | O | X | X |
| Coloring after heat press after preprocessing | O | O | O | O | O | O | O | O |
| Color irregularity after white ink textile printing | O | O | O | O | O | O | X | X |

It can be understood from Table 3 that the ink set which includes the preprocessing liquid for textile printing containing the polyvalent metal compound, the resin emulsion, the heat discoloration type coloring material, and water and the white ink for ink jet textile printing (respective examples) can be uniformly applied to the fabric in the preprocessing since it is possible to provide preprocessing liquid capable of preventing occurrence of color irregularity and check whether or not the preprocessing liquid has been uniformly applied to the fabric before printing as compared with other ink sets (respective comparative examples). Furthermore, it can be also understood that excellent quality of the printed textile is achieved since the coloring caused by the preprocessing liquid disappears if the heat treatment is performed after the preprocessing.

What is claimed is:

1. Preprocessing liquid for textile printing comprising:
   a polyvalent metal compound;
   resin emulsion;
   a heat discoloration type coloring material; and
   water,
   wherein the polyvalent metal compound condenses pigments in the ink which is applied to the textile and suppress the pigments permeating the inside of the textile,
   the resin emulsion fixes the pigments in the ink to the textile as the preprocessing liquid for the textile is dried,
   the heat discoloration type coloring material forms color to show presence and degree of the application irregularity of the preprocessing liquid to the textile, and becomes unnoticeable in the textile by thermal treatment, and
   the water is included in a water-based solvent.

2. The preprocessing liquid for textile printing according to claim 1,
   wherein discoloration of the heat discoloration type coloring material caused by the heat is implemented through a thermal irreversible reaction.

3. The preprocessing liquid for textile printing according to claim 1,
   wherein the preprocessing liquid forms color in an environment temperature at which the preprocessing liquid is applied to the textile, and becomes unnoticeable in the textile by thermal treatment of the textile thorough a thermal irreversible reaction.

4. An ink set for ink jet textile printing comprising:
   the preprocessing liquid for textile printing according to claim 1; and white ink for ink jet textile printing which contains white pigment, wherein the preprocessing liquid is for the preprocessing of the textile printing of the white ink, and the white ink is used for the purpose of hiding the textile or forming a base layer to which non-white ink is adhered.

5. An ink jet textile printing method using the preprocessing liquid for ink jet textile printing according to claim 1, the method comprising:

applying the preprocessing liquid for textile printing to textile;

confirming whether the preprocessing liquid has been uniformly applied using a color of the preprocessing liquid;

heating the textile so that the heat discoloration type coloring material in the preprocessing liquid becomes unnoticeable in the textile; and ink for ink jet textile printing by ejecting the ink to adhere to the textile.

6. The ink jet textile printing method according to claim 5 further comprising heating the textile after ink jet textile printing.

7. Preprocessing method for ink jet textile printing, the method comprising: applying the preprocessing liquid for textile printing of claim 1 to a textile; confirming whether the preprocessing liquid has been uniformly applied using the color of the preprocessing liquid.

8. Preprocessing method for ink jet textile printing according to claim 6, the method further comprising after confirming:

heating the textile so that the heat discoloration type coloring material in the preprocessing liquid becomes unnoticeable in the textile heating the fabric after the preprocessing process at a temperature of not less than 100° C., and drying applied preprocessing liquid for textile printing.

\* \* \* \* \*